United States Patent [19]
Workman, Jr.

[11] 3,970,151
[45] July 20, 1976

[54] TORQUE RESPONSIVE MOTOR SHUTOFF FOR POWER TOOL

[75] Inventor: William Workman, Jr., Spring Lake, Mich.

[73] Assignee: Gardner-Denver Company, Dallas, Tex.

[22] Filed: July 3, 1975

[21] Appl. No.: 592,838

[52] U.S. Cl. ................................................. 173/12
[51] Int. Cl.² ........................................ B23B 45/04
[58] Field of Search ........................... 173/12, 136 A

[56] References Cited
UNITED STATES PATENTS

| | | | |
|---|---|---|---|
| 3,645,341 | 2/1972 | Amtsberg | 73/136 A X |
| 3,666,021 | 5/1972 | Whitehouse | 173/12 |
| 3,821,991 | 7/1974 | Alexander | 173/12 |
| 3,834,467 | 9/1974 | Fuchs | 173/12 |

*Primary Examiner*—Ernest R. Purser
*Assistant Examiner*—William F. Pate, III
*Attorney, Agent, or Firm*—Michael E. Martin

[57] ABSTRACT

A pneumatic power tool for tightening threaded fasteners includes a planetary gear unit in which the ring gear is rotatable against the bias of a torsion coil spring to actuate a motor shutoff control valve at a predetermined torque reaction exerted on the ring gear. The torsion spring is in a substantially relaxed state during fastener rundown and before torque buildup on the fastener regardless of the torque setting at which motor shutoff is to occur. Adjustment of the motor shutoff torque setting is obtained by changing the positional relationship between a control valve pushrod and a cam surface on the ring gear member.

11 Claims, 12 Drawing Figures

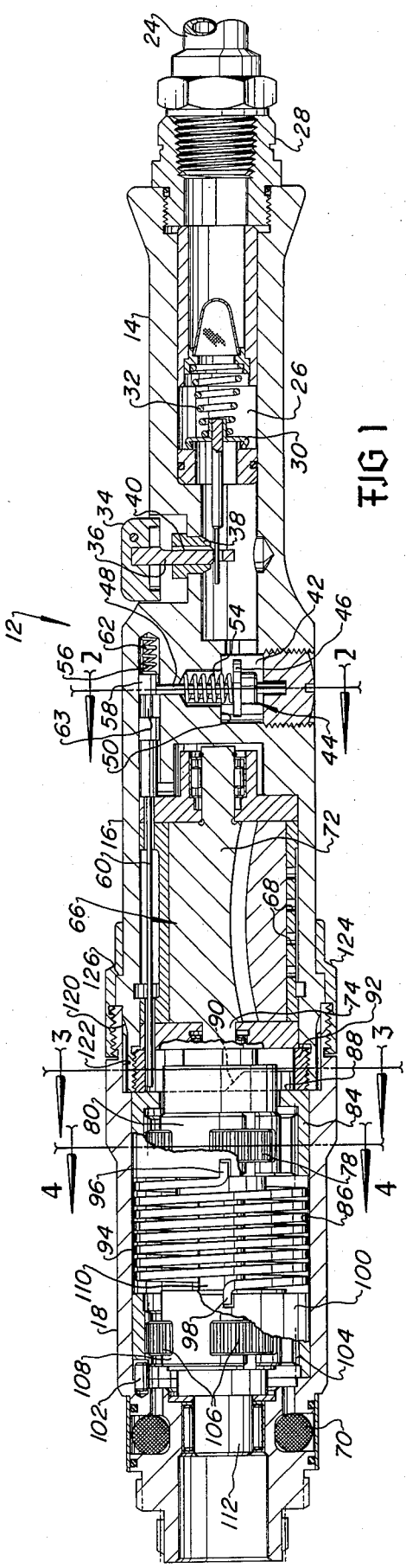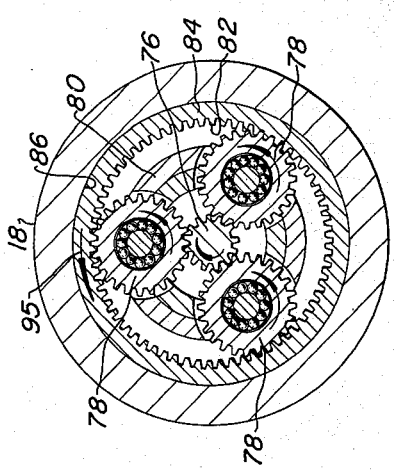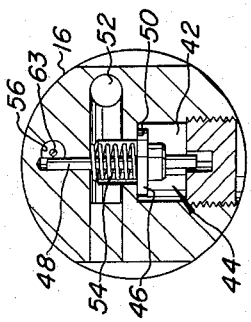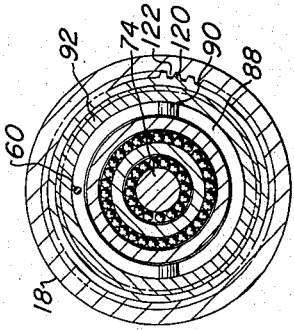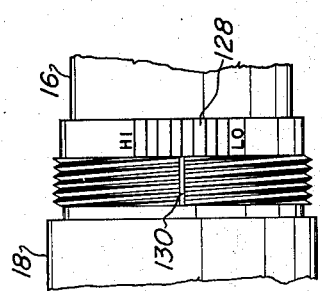

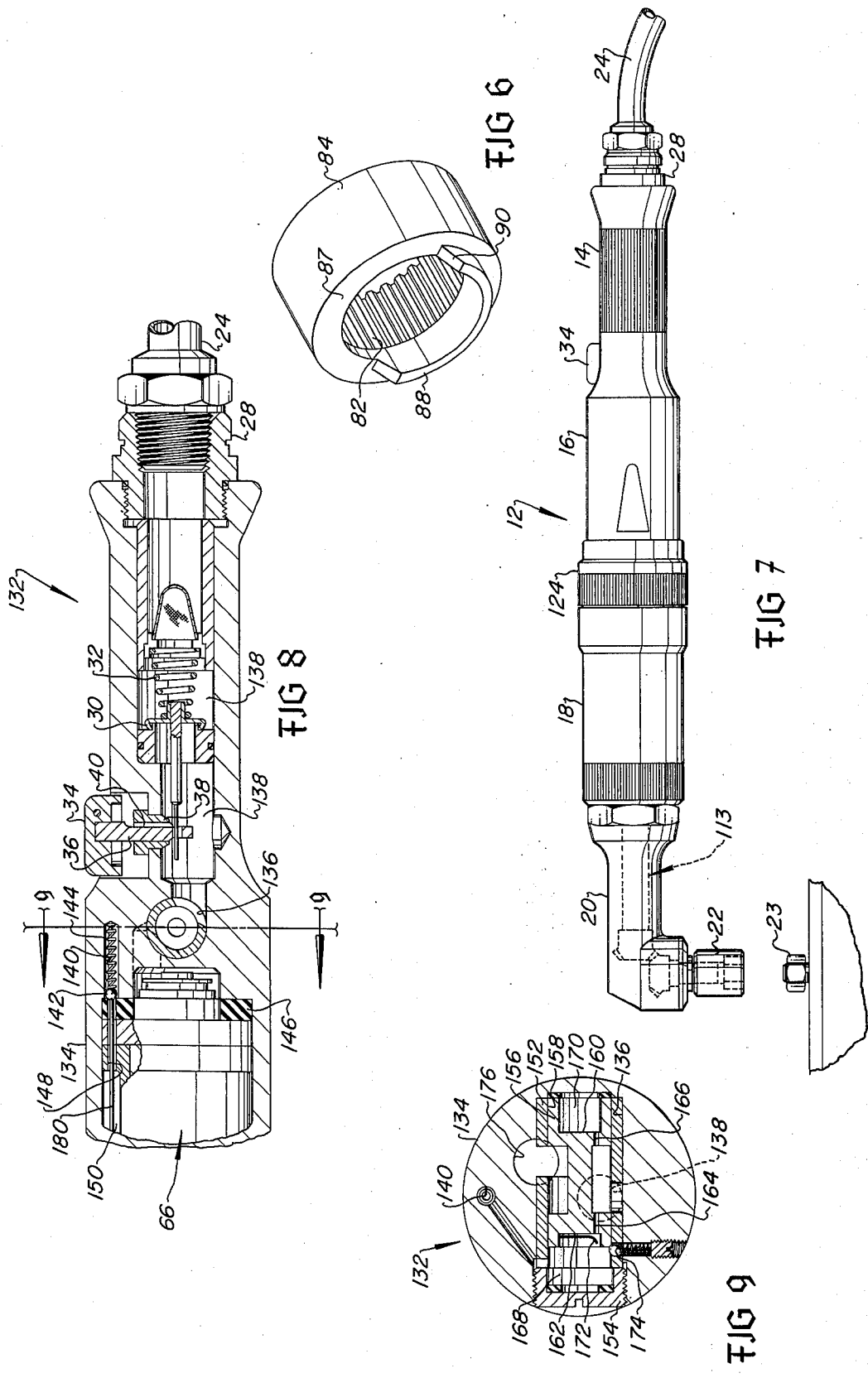

TORQUE RESPONSIVE MOTOR SHUTOFF FOR POWER TOOL

BACKGROUND OF THE INVENTION

In the art of power tools for tightening threaded fasteners many of the uses of such tools require relatively precise control of the final torque exerted on the fastener when making up the joint or connection. A considerable range of joint stiffness as well as other factors must be accommodated while yet providing accurate control of the torque applied to the fastener itself. The solution to this problem has been attempted by the development of numerous types of control devices for controlling the torque output of power wrenches, nutsetters and the like.

It has been determined that in tightening fasteners in joints which exhibit a very stiff or hard makeup, that is a joint in which the fastener reaches its final desired torque very rapidly after a relatively torque-free rundown operation, that overtightening of the fastener is difficult to avoid because of the rotational inertia of the tool rotating parts and because of the elapsed time required to effect deenergization of the tool motor by prior art control mechanisms.

Various control devices including types which sense changes in the rotative speed of the drive spindle and types which sense changes in pressure of the working fluid in pneumatic power tools have been only partially successful in meeting the need for precise torque control. Many of the prior art mechanisms which sense the reaction torque on the tool are slow operating or, in the case of electrical sensors, are expensive and somewhat unreliable when used in the typical operating environment of power tools used for assembly operations.

SUMMARY OF THE INVENTION

The present invention provides for an improved motor shutoff control for a power tool for tightening threaded fasteners and the like which is capable of relatively precise control of the final torque exerted on the fastener. The control mechanism of the present invention operates to sense the reaction torque on the ring gear of a planetary gear set in the drive mechanism of the tool to effect actuation of a motive fluid shutoff valve to cause deenergization of the tool motor.

The improved motor shutoff control of the present invention also provides for relatively precise control of the final torque exerted on the fastener by minimizing the effect of the rotational inertia of the rotating parts of the tool when tightening fasteners in so-called hard or very stiff joint connections. The torque reactive ring gear in the tool drive mechanism moves against the bias of a torsion coil spring as the torque applied to the fastener increases to the desired final torque. The torsion spring is normally in a relaxed condition during the relatively low torque "rundown" portion of the tightening process and is able to absorb a large portion of the rotational inertia of the tool rotating parts to prevent overtorquing of the fastener regardless of the torque setting at which motor shutoff is to be effected.

The motor shutoff torque control of the present invention also provides for improved means for adjusting the torque setting of the shutoff mechanism which is not easily tampered with or otherwise subject to unwanted change in the intended torque at which motor shutoff occurs.

The torque control motor shutoff mechanism of the present invention further comprises relatively few and lightweight parts and is thereby inherently reliable and responsive as a torque sensing and control device for power tools.

BRIEF DESCRIPTION OF THE DRAWINGS

FIG. 1 is a longitudinal section view of a pneumatic power tool as shown in FIG. 7 and in accordance with the present invention;

FIG. 2 is a transverse section view taken along the line 2—2 of FIG. 1 showing the shutoff valve in the closed position;

FIG. 3 is a transverse section view taken along the line 3—3 of FIG. 1;

FIG. 4 is a transverse section view taken along the line 4—4 of FIG. 1;

FIG. 5 is a view taken from the line 5—5 of FIG. 1 with the housing retainer nut removed;

FIG. 6 is a perspective view of the torque sensing ring gear showing the cam surfaces thereon;

FIG. 7 is a longitudinal side elevation of a pneumatic nutsetter incorporating the torque responsive motor shutoff of the present invention;

FIG. 8 is a section view through a portion of a tool housing showing an alternate embodiment of the present invention;

FIG. 9 is a transverse section view taken along the line 9—9 of FIG. 8;

DESCRIPTION OF THE PREFERRED EMBODIMENTS

Figure 10:
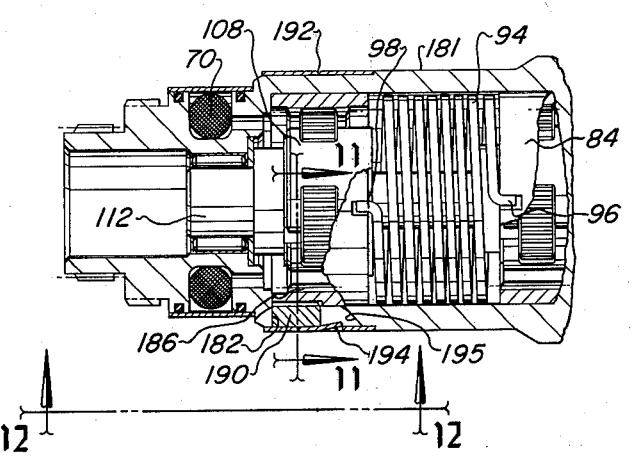
FIG. 10 is a longitudinal section through a portion of an alternate embodiment of the present invention comprising an alternate mechanism for adjusting the shutoff torque setting.

Referring to FIGS. 1 and 7 a hand-held power tool comprising a pneumatic wrench or nutsetter is shown and generally designated by the numeral 12. The tool 12 includes a handle 14 integrally formed with a motor housing part 16 which is suitably coupled to a housing part 18 containing drive gearing and part of an improved torque control motor shutoff mechanism to be described in more detail herein. As shown in FIG. 7 the tool 12 also includes a right angle drive attachment or unit 20 to which is connected a rotatable wrench socket 22 for driving a threaded fastener 23. Pressure fluid such as compressed air is supplied to the tool 12 by a suitable conduit 24 connected to a passage 26 within the handle 14 by way of a coupling member 28.

Referring particularly to FIG. 1, the tool 12 further includes a motive fluid shutoff valve 30 of a well known type which is interposed in the passage 26. The valve 30 is biased into the closed position by a spring 32 and is manually actuated to be opened by depressing a trigger 34. The trigger 34 includes a stem 36 disposed for reciprocal movement in a bore in a bushing 38. The stem 36 includes a pressure relief groove 40 for relieving the working fluid pressure in the passage 26 downstream of the valve 30 when said valve is closed.

The passage 26 is in communication with a chamber 42 in which is disposed valve means comprising a valve closure member 44 having a flange 46 and a stem portion 48. A transverse wall surface 50 in the chamber 42 forms a seat for the flange 46 of the valve member 44.

In the position shown in FIG. 2 the valve member 44 is seated against the surface 50 to shut off motive fluid flow from the chamber 42 to a passage 52 which leads to the tool motor. A coil spring 54 is disposed around the stem 48 and operates to bias the valve member 44 into the open position shown in FIG. 1 whereby pressure fluid may flow into the passage 52 when the valve 30 is also open.

The stem 48 of the valve member 44 extends through a close fitting bore into a longitudinal intersecting bore 56. A member comprising an elongated rod 60 includes a head portion 58 which is disposed in the bore 56 and is biased into the position shown in FIG. 1 by a coil spring 62. The head portion 58 is engaged by the stem 48 in the position shown in FIG. 1 thereby preventing the valve member 44 from closing. The head portion 58 includes a groove 63 which, when aligned with the stem 48 as shown in FIG. 2, will allow the valve member 44 to close under the urging of pressure fluid acting on the valve member in opposition to the biasing effect of the spring 54. A resultant pressure force acts to tend to close the valve member 44 when pressure fluid is flowing through chamber 42 to the passage 52, partly resulting from a small pressure decrease across the orifice formed between the valve member and the seat surface 50.

The tool 12 includes a motor, generally designated by numeral 66, which is disposed in the housing part 16. The motor 66 is of the conventional rotary vane type and includes a suitable motive fluid inlet port, not shown, which is in communication with the passage 52. Suitable passage means formed in the housing part 16 are in communication with the motor exhaust ports 68 by which exhaust fluid flow is conducted into the interior of the housing part 18 and therethrough to final exit from the tool through a muffler 70.

The motor 66 includes a rotor 72 having an integral shaft 74, FIG. 3, which also comprises a gear 76, FIG. 4, comprising the sun gear of a planetary gear unit. A plurality of planet gears 78 are meshed with the sun gear 76 and are rotatably supported on a planet gear carrier 80. The planet gears 78 are also meshed with the teeth of an internal gear 82 also known as a ring gear. The ring gear 82 is formed on a cylindrical member 84 disposed in close fitting but rotatable relationship in a bore 86 which forms a portion of the interior of the housing part 18. Referring to FIG. 6 also the member 84 is further characterized by a transverse end face 87 from which projects an axially extended cam surface 88 having an axially sloping ramp portion 90. The member 84 is retained axially in the bore 86 by a sleeve 92 threadedly disposed in the housing part 16, and by a torsion coil spring 94 disposed on the side of the member 84 which is opposite the transverse end face 87. The torsion coil spring 94 includes a tang 96 which is disposed in a suitable slot formed in the member 84 whereby rotation of the member 84 in the direction of the arrow 95 in FIG. 4 is resisted by the spring. The spring 94 has a second tang 98 at its opposite end which is disposed in a similar slot in a member 100 housed within the bore 18.

The member 100 is fixed against rotation in the bore 18 by a key 102 interfitted between the member 100 and the housing part 18. The member 100 also includes internal gear teeth forming a ring gear 104 of a second planetary gear unit which includes planet gears 106 mounted on a carrier 108. The planet gears 106 are disposed to be engaged with a sun gear, not shown, connected to an axially extending shaft portion 110 of the planet gear carrier 80. The carrier 108 also includes a shaft portion 112 which is suitably connected to drive mechanism, generally designated by numeral 113, disposed in the right angle drive unit 20 as shown in FIG. 7 for driving the socket member 22. As may be appreciated by those skilled in the art the shaft portion 112 might be directly connected to a final drive spindle or to some other form of rotation transmitting mechanism which would be connected to a wrench socket or the like.

The rod 60 comprises a cam follower and is disposed in the tool 12 to have its end opposite the end formed by the head 58 in close proximity to the surface 87 of the member 84 when the rod is free to be moved under the urging of the spring 62. The rod 60 may be displaced from the position shown in FIG. 1 to a position in which the groove 63 is aligned with the stem 48 of the shutoff valve member 44 in response to rotation of the member 84 whereby the ramp 90 of the cam 88 will engage and move the rod to the right, viewing FIG. 1. Displacement of the rod in the aforementioned manner will, when the tool is operating, effect closing of the valve member 44 to shut off the supply of motive fluid to the tool motor 66. Upon release of the trigger 34, after motor shutoff, any residual motive fluid under pressure in the chamber 42 will be vented through the groove 40 thereby allowing the spring 54 to reset the valve member 44 in the open position shown in FIG. 1.

When motive fluid to the motor 66 has been shut off the torsion spring 94 will rotate in the opposite direction and return to its original relaxed or unloaded position thereby also returning the member 84 to a position which will allow the rod 60 to be reset when the valve member 44 has moved to the position of FIG. 1.

The member 84 will rotate in the housing 18 to actuate the rod 60 in response to a reaction torque transmitted to the ring gear 82 which is proportional to the torque exerted on a fastener by the final drive mechanism of the tool 12. The rotation of the ring gear will be resisted by the torsion spring 94 and accordingly the torque at which the ramp 90 engages and displaces the rod 60 to effect closing of the valve member 44 may be controlled by the torsional deflection of the spring.

In the present invention it has been determined that unexpected improvements in control of the torque exerted on a fastener are realized with the type of mechanism disclosed wherein the torsion coil spring 94 remains substantially in a relaxed or unloaded condition when virtually no reaction torque is exerted on the ring gear 82, as would be the case during the relatively free running portion of a tool operating cycle when resistance to turning the fastener is nil. With this arrangement of the torsion spring 94 and the cam and pushrod shutoff mechanism herein described the reaction torque exerted on the ring gear 82, as the resistance to turning of the fastener increases, can be absorbed by the spring through rotation of the member 84 with a concomitant deceleration of the motor rotor 72. Accordingly, in use of the tool 12 on so-called hard joints, as well as others, the considerable inertia or kinetic energy in the motor rotor and other rotating parts can be dissipated or absorbed by the spring 94 as it is wound by the rotation of the member 84, and therefore overtightening of the fastener is reduced or eliminated.

Moreover, with the cam and pushrod actuating mechanism disclosed, the torque at which motor shutoff is effected may be controlled by changing the positional relationship of the rammp 90 with respect to the rod 60 instead of preloading or winding the spring 94 to change the reaction torque value at which movement of the member 84 commences. The position of the rod 60 with respect to the ramp 90 may be changed by rotation of the housing part 18 with respect to the part 16. The housing parts 16 and 18 are formed with interfitting splines 120 and 122. Axial separation of the parts 16 and 18 is prevented by a removable nut 124 which is threadedly engaged with the part 18 and bears against a transverse step 126 on the part 16. Accordingly, the housing part 18 may be separated from part 16 and rotated in increments to change the at rest or unloaded position of the cam with respect to the rod 60. As shown in FIG. 5 suitable indicia 128 may be placed on the housing part 16 which in cooperation with the groove 130 formed on the part 18 will provide for indicating the torque setting of the tool at which motor shutoff will be effected.

When the tool 12 is applied to a fastener driving operation a typical operating cycle will comprise an initial turning or rundown of the fastener which will be at a relatively low torque and usually only that necessary to overcome the nominal friction of the threads. If the joint being made up by the fastener comprises one or more so-called soft or compressible components (i.e., a soft gasket, lock washer or the like) the torque increase will be relatively gradual as the ring gear member rotates in relation to the torque increase until the rod 60 is actuated by the cam 88 to allow the valve member 44 to snap closed against the surface 50. In the aforementioned type of operation the motor rotor and other rotating drive members of the tool will also decelerate relatively slowly as the motor shutoff torque value is approached and the kinetic energy remaining in the tool drive train including the motor rotor will be low at shutoff. On so-called hard make-up type joints the deceleration of the tool rotating parts will be substantially greater and a large portion of the kinetic energy due to rotational inertia which will be dissipated is absorbed by the spring as it starts to wind up from a substantially relaxed condition until the cam 88 is rotated sufficiently to actuate the rod 60. Residual kinetic energy remaining in the tool rotating parts after motor shutoff will tend to be absorbed by the cushioning action of the spring 94 as it continues to wind up in response to reactive torque imposed on the member 84.

The motor shutoff mechanism of the present invention has proven to be capable of improved control of the final torque exerted on a threaded fastener or the like in a wide range of applications. The superior torque sensing ability of the ring gear member 84 together with the arrangement of the relatively low mass of the actuating rod 60 and the valve closure member 44 provides rapid motor shutoff. Furthermore, the arrangement of the torsion spring 94 which is in a substantially unloaded condition during the free running low torque portion of the operating cycle, provides for improved absorption of the inertial torque exerted by the deceleration of the rotating members including the motor rotor 72.

An alternate embodiment of the present invention is shown in FIGS. 8 and 9. The embodiment of FIGS. 8 and 9 differs in the type of shutoff valve which shuts off the flow of air to the motor 66 in response to actuation of a pushrod by the ring gear cam 88. Accordingly, only the portion of the tool which differs from the construction disclosed in FIGS. 1 through 6 is shown in the drawings. Parts common to both tool embodiments are designated with the same reference numerals. Referring to FIGS. 8 and 9 a tool similar to the tool 12 except in the respects described herein is shown and designated by the numeral 132. The tool 132 comprises a housing part 134 which may be used in place of the housing part 16 to form a tool assembly with the housing part 18 shown in FIG. 1. A transverse bore 136 is formed in the housing part 134 and a motive air inlet passage 138 is in communication with the bore 136. The tool 132 also includes a small longitudinal bore 140 in which is disposed a ball valve element 142 which is biased by a spring 144 into a seated or closed position against a seat formed by a non-metal annular ring element 146. The ball valve element 142, in the position shown in FIG. 8, closes over a passage 148 which is in communication with a motor exhaust conduit 150.

As shown in FIG. 9, a sleeve 152 is disposed in the bore 136 and retained therein by a threaded plug 154. A movable valve element in the form of a lightweight cylindrical spool 156 is disposed in a bore 158 formed in the sleeve 152 which bore is in communication with the passage 138 in all positions of the spool. The spool 156 includes opposed pressure surfaces 160 and 162. Passages 164 and 166 in the spool provide for conducting pressure fluid into respective chambers 168 and 170. A flexible valve closure element 172 is suitably retained on the spool 156 and is operable to close over the passage 164 when the fluid pressure in the chamber 168 exceeds the fluid pressure in the passage 138. The vent passage 140 is in communication with the chamber 168 as shown in FIG. 9. A spring biased detent mechanism 174 operates to releasably hold the spool 156 in the position shown in FIG. 9 whereby pressure air may be conducted from passage 138 through the bore 158 to a motor inlet passage 176. An actuating rod 180, similar to the rod 60 of FIG. 1, is operable to unseat the valve element 142 in response to being axially displaced by the cam 88 disclosed in FIGS. 1 and 6. Unseating of the valve element 142 will result in venting of the chamber 168. The rapid release of pressure in chamber 168 will create an unbalanced pressure force acting on the spool 156 causing the spool to move to the left, viewing FIG. 9, thereby closing off communication of pressure fluid to the motor inlet passage 176.

Upon motor shutoff the spring 94 will unwind to rotate the cam 88 and permit displacement of the rod 180 and the valve element 142 to the position shown in FIG. 8. Accordingly, fluid at a high pressure will remain trapped in chamber 168 by the flexible valve element 172 when the trigger 34 is released to close the valve 30 and vent the inlet passage 138 through the groove 40. An unbalanced force acting on surface 162 due to the fluid pressure in chamber 168 will cause the spool 156 to move back to the position shown in FIG. 9. The spool will, however, remain in the aforedescribed fluid shutoff position until the trigger 34 is released to effect a reduction of pressure in the passage 138.

Figure 12:
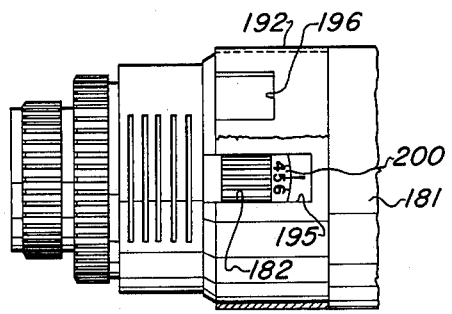
FIG. 12 is a view taken from line 12—12 of FIG. 10.
Figure 11:
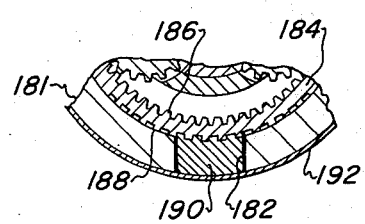
FIG. 11 is a section view taken along the line 11—11 of FIG. 10.

An alternate embodiment of mechanism for adjusting the torque setting at which motor shutoff is effected is shown in FIGS. 10 through 12 of the drawings. The mechanism shown in FIG. 10 provides for adjustment of the torque setting without separation of the housing parts as is required in the tool embodiment shown in FIG. 1. Only that portion of the tool affected by the alternate construction of the shutoff torque adjusting mechanism is shown in the drawing FIGS. 10 through 12.

Referring to FIGS. 10 through 12 a housing part 181, similar to housing part 18, is adapted to have an opening 182 therein which is adjacent a member 184. The member 184 comprises a ring gear portion 186 and is further connected to the torsion spring 94 in the same manner as the member 100 shown in FIG. 1. The member 184 also includes serrations 188 on the outside wall surface which may be aligned with the opening 182 and which are engageable with cooperating serrations on a retaining key 190 shown disposed in the opening 182 in FIGS. 10 and 11. The key 190 functions to prevent unwanted rotation of the member 184. A cylindrical sleeve 192 is disposed around the outside of the housing part 181 and, as shown in FIGS. 10 and 11, retains the key 190 in the opening 182. In FIG. 12 the sleeve 192 is shown partially broken away to expose the opening 182 with the key 190 removed. As shown in FIG. 12 also, the sleeve 192 includes a recess 196 which may, by rotating the sleeve, be aligned with the opening 192 to provide for removal of the retaining key 190. With the retaining key 190 removed a suitable tool, such as a conventional screwdriver bit, may be inserted in the opening 182 to rotate the member 184 a desired number of increments. Rotation of the member 184 will also result in rotation of the spring 94 and the member 84 to thereby change the position of the cam 88 with respect to the shutoff valve actuating rod. Unwanted rotation of the sleeve 192 is prevented by a deflectable tang portion 194 which is engageable with a slot 195 formed in the housing part 181 adjacent to the opening 182. Suitable indicia 200 may be disposed on the member 184 to indicate the torque setting at which motor shutoff will be effected. Accordingly, the mechanism shown in FIG. 10 may be used to change the torque value at which motor shutoff is to be effected and without disassembly of the tool housing parts.

What is claimed is:

1. A power tool for tightening threaded fasteners and the like comprising:
   housing means;
   a pressure fluid operated motor disposed in said housing means;
   valve means disposed in said housing means and operable to shut off the flow of pressure fluid through said motor;
   drive mechanism including a planetary gear unit connected to said motor for rotatably driving a threaded fastener;
   a first member disposed in said housing means and interposed in said drive mechanism, said first member comprising a rotatable ring gear of said planetary gear unit and a cam disposed on said first member and rotatable with said ring gear in response to a reaction torque imposed on said ring gear which is proportional to the torque exerted on said fastener;
   a cam follower disposed for engagement by said cam and responsive to the rotation of said ring gear to effect actuation of said valve means to shut off the flow of pressure fluid through said motor at a predetermined torque exerted on said fastener; and,
   a torsion coil spring disposed in said housing means and connected to said first member and being operable to be deflected from a substantially relaxed condition in response to rotation of said ring gear regardless of the predetermined torque at which motor shutoff is to be effected.

2. The invention set forth in claim 1 together with:
   means for changing the position of said cam with respect to said cam follower to thereby change the torque setting at which said cam follower effects actuation of said valve means to shut off the flow of pressure fluid through said motor.

3. The invention set forth in claim 2 wherein:
   said means for changing the position of said cam comprises a third member disposed in said housing means and connected to said torsion spring, said third member being rotatable in said housing means for rotating said torsion spring and said first member to change the position of said cam with respect to said cam follower.

4. The invention set forth in claim 3 together with:
   means for locking said third member to prevent rotation of said third member in said housing means.

5. The invention set forth in claim 4 wherein:
   said means comprises a removable key cooperable with said housing means and said third member for locking said third member to prevent rotation thereof with respect to said housing means.

6. The invention set forth in claim 5 wherein:
   said housing means includes an opening therein for receiving said key, and said housing means further includes a sleeve disposed on said housing means for retaining said key in said opening, said sleeve being movable on said housing means to provide for removing said key from said opening.

7. The invention set forth in claim 2 wherein:
   said housing means comprises a first housing part having said cam follower and said valve means disposed therein, and said housing means further comprises a second housing part having said first member and said torsion spring disposed therein and separable from said first housing part; and said means for changing the position of said cam comprises interfitting splines disposed on said first and second housing parts to provide for connecting said first housing part to said second housing part in a plurality of rotative positions.

8. The invention set forth in claim 1 wherein:
   said housing means includes a passage for conducting pressure fluid to said motor, and said valve means comprises a valve member interposed in said passage and operable by pressure fluid acting thereon, and in response to movement of said cam follower, to shut off the flow of pressure fluid to said motor.

9. The invention set forth in claim 8 wherein:
   said cam follower comprises an elongated rod having one end engageable with said cam and having an opposite end portion for holding said valve member in an open position disposed to be engaged with said valve member, and upon movement of said rod by said cam said valve member is released by said rod to be closed by a pressure force acting thereon.

10. The invention set forth in claim 8 wherein:
    said valve member comprises a cylindrical spool having a pressure surface thereon disposed in a chamber in said housing means, and said tool includes a pilot valve engageable with said cam follower and movable by said cam follower to cause a change in the fluid pressure in said chamber whereby said spool is moved to shut off the flow of pressure fluid to said motor.

11. A power tool for tightening threaded fasteners and the like comprising:
 housing means;
 a motor disposed in said housing means and operable to produce rotary driving torque;
 means disposed in said housing means and operable to effect the stopping of said motor;
 drive mechanism including a planetary gear unit connected to said motor for rotatably driving a threaded fastener;
 a first member disposed in said housing means and interposed in said drive mechanism, said first member comprising a rotatable ring gear of said planetary gear unit and a cam disposed on said first member and rotatable with said ring gear in response to a reaction torque imposed on said ring gear which is proportional to the torque exerted on said fastener;
 a cam follower disposed for engagement by said cam and responsive to the rotation of said ring gear to effect actuation of said means to effect the stopping of said motor at a predetermined torque exerted on said fastener; and,
 a torsion coil spring disposed in said housing means and connected to said first member and being operable to be deflected from a substantially relaxed condition in response to rotation of said ring gear regardless of the predetermined torque at which the stopping of said motor is to be effected.

* * * * *